(12) United States Patent
Monk et al.

(10) Patent No.: US 8,073,943 B2
(45) Date of Patent: Dec. 6, 2011

(54) GRAPHICAL USER INTERFACE FOR ADDING MEASUREMENTS TO EXISTING DISTRIBUTED NETWORK TROUBLESHOOTING SYSTEM

(75) Inventors: John M. Monk, Monument, CO (US); Robert H. Kroboth, Peyton, CO (US)

(73) Assignee: JDS Uniphase Corporation, Milpitas, CA (US)

(*) Notice: Subject to any disclaimer, the term of this patent is extended or adjusted under 35 U.S.C. 154(b) by 1889 days.

(21) Appl. No.: 10/718,546

(22) Filed: Nov. 24, 2003

(65) Prior Publication Data

US 2005/0114500 A1 May 26, 2005

(51) Int. Cl.
*G06F 15/173* (2006.01)
(52) U.S. Cl. ........................ 709/224; 715/238

(58) Field of Classification Search .............. 709/224; 715/738
See application file for complete search history.

(56) References Cited

U.S. PATENT DOCUMENTS

2001/0023455 A1* 9/2001 Maeda ..................... 709/242
2005/0081157 A1* 4/2005 Clark et al. ................ 715/736

* cited by examiner

*Primary Examiner* — Ajay Bhatia
*Assistant Examiner* — Bryan Lee
(74) *Attorney, Agent, or Firm* — Matthew A. Pequignot; Pequignot + Myers LLC

(57) ABSTRACT

A graphical user interface provides a link to network related measurements by network analysis devices, to present a test including perceptibly correlated network-related measurements by two or more of the network analysis devices through a selectable graphical display corresponding to the network analysis devices, and a selectable graphical display corresponding to at least one measurement for each selected network analysis device. The test provides a newly added measurement.

17 Claims, 11 Drawing Sheets

GRAPHICAL USER INTERFACE FOR ADDING MEASUREMENTS TO EXISTING DISTRIBUTED NETWORK TROUBLESHOOTING SYSTEM

BACKGROUND OF THE INVENTION

1. Field of the Invention

The present invention is directed to a graphical user interface to a test as a collection of correlated network-related measurements on a distributed network troubleshooting system. More particularly, the present invention is directed to a user interface allowing a user to add measurements from different network analysis devices into a test so that those measurement results can be visually correlated.

2. Description of the Related Art

FIG. 1 is a diagram of a conventional distributed networking problem domain in which a plurality of network analysis agents (network troubleshooting agents) 20a-n, 22a-n, and 24a-n (NAs) provided on networks 26a-n (network 26), measure how the network 26 performs as network devices (computers) 28a-n perform their respective jobs (e.g., data communication) on the network 26.

In FIG. 1, as an example, the network 26a is an Internet Protocol (IP) network, the networks 26b and 26f are telephony networks, and networks 26c, 26d and 26f are other data networks. The network analysis agents 20a and 20b are telephony network analyzers (TNAs), the network analysis agent 22a tracks remote monitoring (RMON) data, and the network analysis agents 24a and 24b are network analyzers (NA) providing protocol vitals as a measurement.

A measurement is something being measured on the network 26. For example, a measurement may determine the amount of IP traffic or voice-over-Internet-Protocol (VOIP) traffic on a packet network. Generally, a measurement represents a plurality of related, measured variables. For example, a measurement of VOIP traffic might be based on related variables, such as packet jitter, packet delay and packet loss. The concept of a measurement is well known.

Network analysis agents 20, 22 and 24 are used to perform measurements. The network analysis agents 20, 22, and 24 can be homogeneous (i.e., same type and/or by same manufacturer) or heterogeneous (i.e., different types and/or by different manufacturers). Network analysis agents are often specialized for performing particular measurements. Moreover, a single network analysis can often perform multiple measurements. Network analysis agents are well known, such as those available from Agilent Technologies, Inc., Palo Alto, Calif., assignee of the present application.

However, in conventional distributed network troubleshooting systems, one network-related measurement (measurement) is run on one network analysis agent, and another measurement is run on another network analysis agent, and so on. Accordingly, conventionally the network related measurements are performed in individual network segments. In the context of troubleshooting a distributed network, a network can be logically segmented based upon network nodes through which connections are managed, such a telephone switch in case of a telephony network. Therefore, typically a network analysis agent is provided at each network segment, such that troubleshooting between two locations on the network may require running at least one measurement at each network segment, and, thus, requiring separate analysis of corresponding measurement results.

For example, to solve a network problem between the San Francisco telephones 28b and the email server 28d, the data of the San Francisco telephone network analyzers (TNA) 20b and the Phoenix RMON 22a must be correlated. However, the conventional distributed network troubleshooting systems fail to provide such a correlation of one or more network analysis agent measurements from two or more network analysis agents, because in the conventional distributed network troubleshooting system, a user has to look at the data for the measurement from the San Francisco TNA 20b in one window, then in a different window look at the data from the Phoenix RMON 22a, and then mentally troubleshoot based upon the information in the two windows, which is difficult and very inefficient, and in particular not possible to mentally analyze the information from the two windows over a time line. Of course, if more than two agent measurements are being analyzed, mental analysis is not effective.

More particularly, with the conventional distributed network troubleshooting systems, when a customer is dissatisfied with something happening on the network, such as connectivity failure, slow performance, etc, the customer calls the service provider. If, for example, the customer is in San Francisco and getting garbled conversations with a phone in Denver, the service provider deploys network analysis agents on the network at various network segments (i.e., the set of network segments) between San Francisco and Denver. Therefore, the service provider has to look at multiple network segments to see which network segment is causing the problem or which combination of segments are causing the problem, and the service provider must analyze all of the data from the deployed network analysis agents in the network segments to come up with a way to troubleshoot and solve the problem.

Although there are some distributed network troubleshooting systems that allow running measurements on multiple devices, the problem with such conventional systems is that the system presents a separate display window or a separate graphical user interface (GUI) per measurement. So there is no way that a user can look at measurement data from different devices all in one user interface. Therefore, the conventional distributed network troubleshooting system fails to correlate one or more network analysis agent measurements from two or more network analysis agents.

Further, the conventional distributed network troubleshooting systems fail to provide a way a user can control configuration and execution of the network analysis agent measurements at two or more network analysis agents from a central place, because conventionally a user basically look at one measurement in one display window, configure the measurement and go to another display window to open and configure another measurement.

More particularly, although some conventional distributed network troubleshooting systems allow a user to look at measurement data remotely on a remote system, so that the user could bring up (open) a window to look at the San Francisco data and then bring up another window to look at the Denver data, these conventional distributed network troubleshooting systems fail to provide a way to dynamically set up a test that contains those two measurements to do the correlation for the user.

SUMMARY OF THE INVENTION

Accordingly the present invention provides a graphical user interface allowing a user to add measurements from different network analysis agents into a test so that those measurement results can be perceptibly, for example, visually, correlated.

Further, when the present invention is integrated into an existing distributed network troubleshooting system, the present invention provides a way to display new measurement functionality in the existing system. As a benefit, the new measurement functionality look like the measurement functionality was originally built into the system.

Additional aspects and advantages of the invention will be set forth in part in the description which follows and, in part, will be obvious from the description, or may be learned by practice of the invention.

The present invention may be achieved by an apparatus comprising a graphical user interface providing a link to network related measurements by network analysis devices, to present a test including visually correlated network-related measurements by two or more of the network analysis devices through a selectable graphical display corresponding to the network analysis devices, and a selectable graphical display corresponding to at least one measurement for each selected network analysis device.

The present invention may also be achieved by a distributed computer network system, comprising a plurality of heterogeneous computer agents on a network and performing heterogeneous network-related measurements, and an apparatus in communication with the heterogeneous computer agents on the network and providing a graphical user interface interfacing with the heterogeneous network-related measurements to manage a heterogeneous test including one or more of the heterogeneous network-related measurements at two or more of the heterogeneous computer agents, and displaying within the graphical user interface a graphical correlated result of the heterogeneous test.

The present invention may also be achieved by a computer in communication via a network with computer agents providing network performance related measurements, the computer comprising a programmed computer processor providing a graphical user interface to the computer agent measurements and to control tests involving one or more computer agent measurements at two or more computer agents.

The present invention may also be achieved by a method comprising presenting a selectable graphical display of known heterogeneous network analysis devices on a network to add into a test, presenting a selectable graphical display of known network-related measurements corresponding to each selected network analysis device, presenting a graphical user interface to the test by displaying a visual correlation of the selected network-related measurements from the heterogeneous network analysis devices.

BRIEF DESCRIPTION OF THE DRAWINGS

The above and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
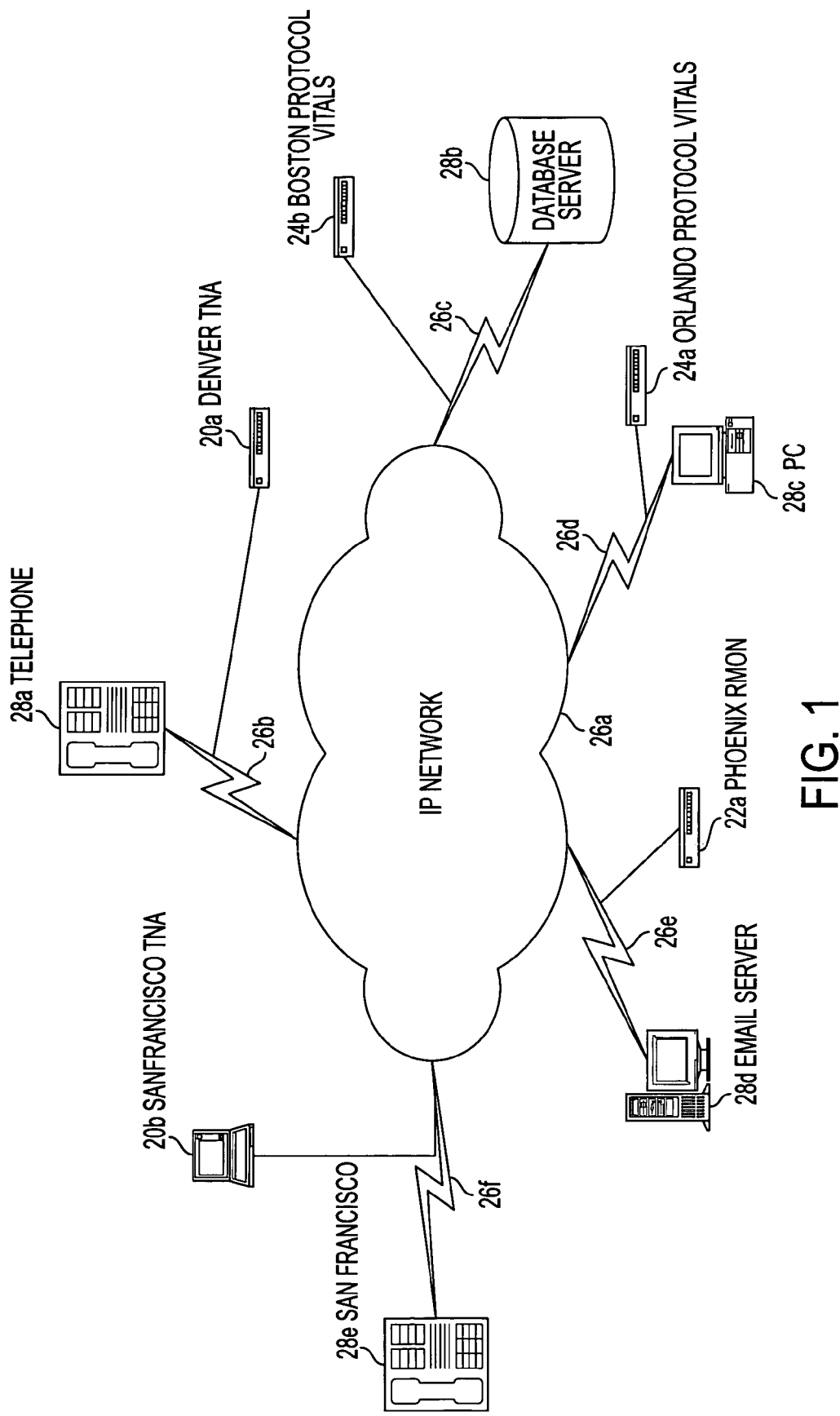
FIG. 1 is a diagram of a conventional distributed networking problem domain.

Reference will now be made in detail to the present embodiments of the present invention, examples of which are illustrated in the accompanying drawings, wherein like reference numerals refer to the like elements throughout. The embodiments are described below to explain the present invention by referring to the figures.

Figure 2:
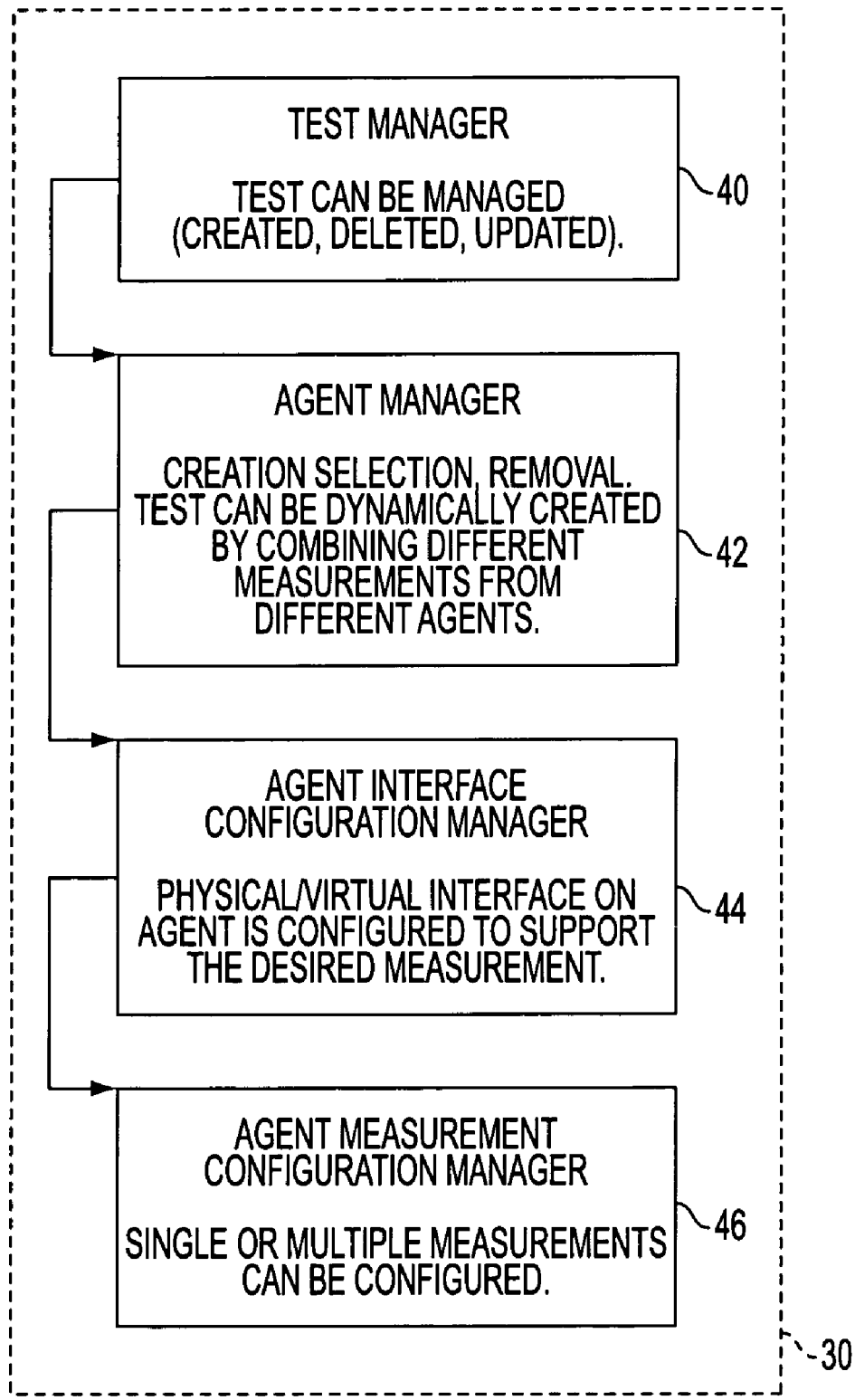
FIG. 2 is a functional block diagram of a graphical user interface for adding tests to a distributed network troubleshooting system, according to an embodiment of the present invention.

FIG. 2 is a functional block diagram of a graphical user interface 30 for adding tests to a distributed network troubleshooting system (network-related measurement test GUI), according to an embodiment of the present invention. As shown in FIG. 2, typically, the network test GUI is segmented according to logical functions implemented as software objects, typically, Java programming language objects, comprising a test manager 40, an agent manager 42, agent interface configuration manager 44, and agent measurement configuration 46. Each GUI manager 40, 42, 44, and 46 presents a GUI allowing adding network-related measurements from different network analysis devices into a "test" so that those measurement results can be perceptibly correlated, and, in particular, visually correlated. The test manager 40 manages creation, update and deletion of a test so that the test manager keeps track of (manages) a test. Generally, a "test" is a collection of perceptibly, typically visually, correlated measurements from two or more homogeneous or heterogeneous agents. And, generally, each "measurement" is one or more network-related variables monitored by a network analysis agent. Each measurement is configured (which includes launching), measured (or monitored, detected as the case may be), determined, collected, and displayed by the network analysis agent (agent). For example, some measurements by a network analyzer 24, which is an example of a network analysis agent, are protocol vitals, commentators, network help, decoding, and protocol statistics.

In FIG. 2, the agent manager 42 manages creation, selection, and removal of network analysis agents to perform the collection of measurements as part of the test. The agent interface configuration manager 44 manages selection and configuration of network interfaces of the network analysis agents involved in the test. The agent measurement configuration manager 46 manages selection, configuration, and removal of a measurement on a network interface of a network analysis agent involved in the test.

Therefore, the present invention is directed to a graphical user interface to a test as a collection of correlated network-related measurements on a distributed network troubleshooting system. More particularly, the present invention is directed to a user interface allowing a user to add network-related measurements from different network analysis devices into a test so that those measurement results can be visually correlated. Typically, a visual correlation of the network-related measurements from multiple and/or different analysis devices as a test is a correlated graph of different network-related measurements on a same time axis so that a user can visually see all of the measurements from all the analysis devices at once.

Figure 3:
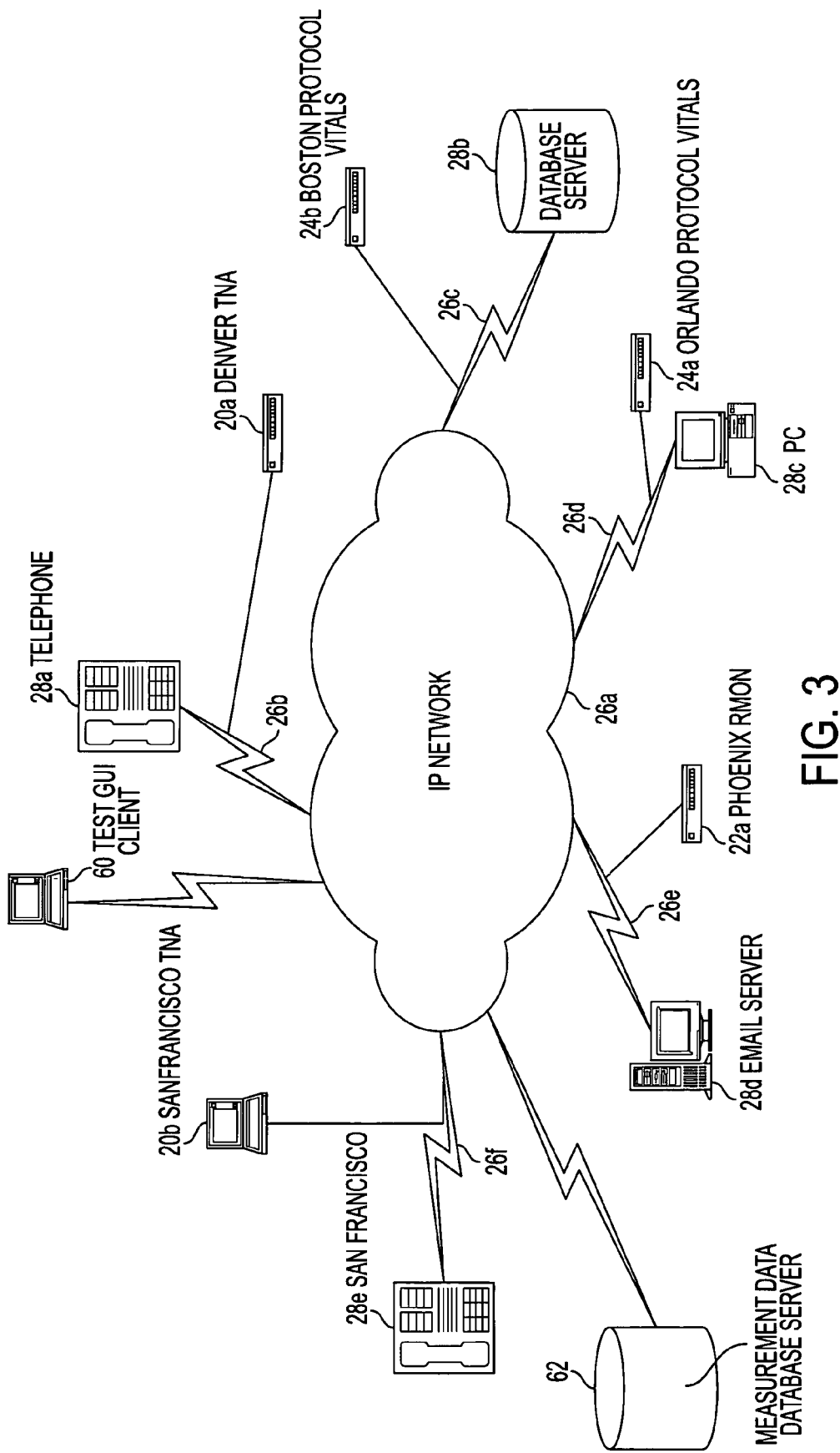
FIG. 3 is a diagram of an example distributed networking problem domain, according to an embodiment of the present invention.

FIG. 3 is a diagram of an example distributed networking problem domain, according to an embodiment of the present invention. The GUI processes of the present invention as embodied in the test manager 40, agent manager 42, agent network interface manager 44, and agent measurement manager 46, are implemented in software and/or computing hardware controlling a networked computing device, such as a personal computer, network analyzer, etc. For example, in client-server network architecture, the GUI manager processes 40 through 46 are embodied in a GUI client computer 60. The test GUI client 60 can be either in a direct communication with network analysis agents 20, 22, and 24, or, in communication with a centralized measurement data server 62, which can be a measurement data server for an existing distributed network troubleshooting system, that collects data from all the various network analysis agents 20, 22, and 24 distributed throughout the network. Typically, the measurement server 62 might process the collected measurement results by analyzing, aggregating, correlating, preparing, etc., the collected measurement results, and make available the processed collected measurement results, via retrieval or transmission, to the test GUI client 60 upon launching a configured test to visually correlate the collected measurement results added in the test. In other words, the GUI 30 displays a visual correlation of the retrieved measurement results added into a test.

The concept of a client-server network architecture and associated operating system and network communication software would be well understood by a person of ordinary skill in the art. Further, although in the above-described example embodiment, the measurement data server 62 performs the measurement data collection and processing, the present invention is not limited to such a configuration, and, for example, the measurement data collection and processing can also be performed on the test GUI client 60. Alternatively, the GUI 30 may be implemented in a Network Troubleshooting Center (NTC) operating as a server. An NTC is a known device and might be, for example, an Agilent™ NTC, such as an Agilent™ Model No. J6801A. Therefore, the GUI 30 might be for the NTC to allow adding measurements from different network analysis devices into a test so that those measurement results can be visually correlated for troubleshooting.

Figure 4:
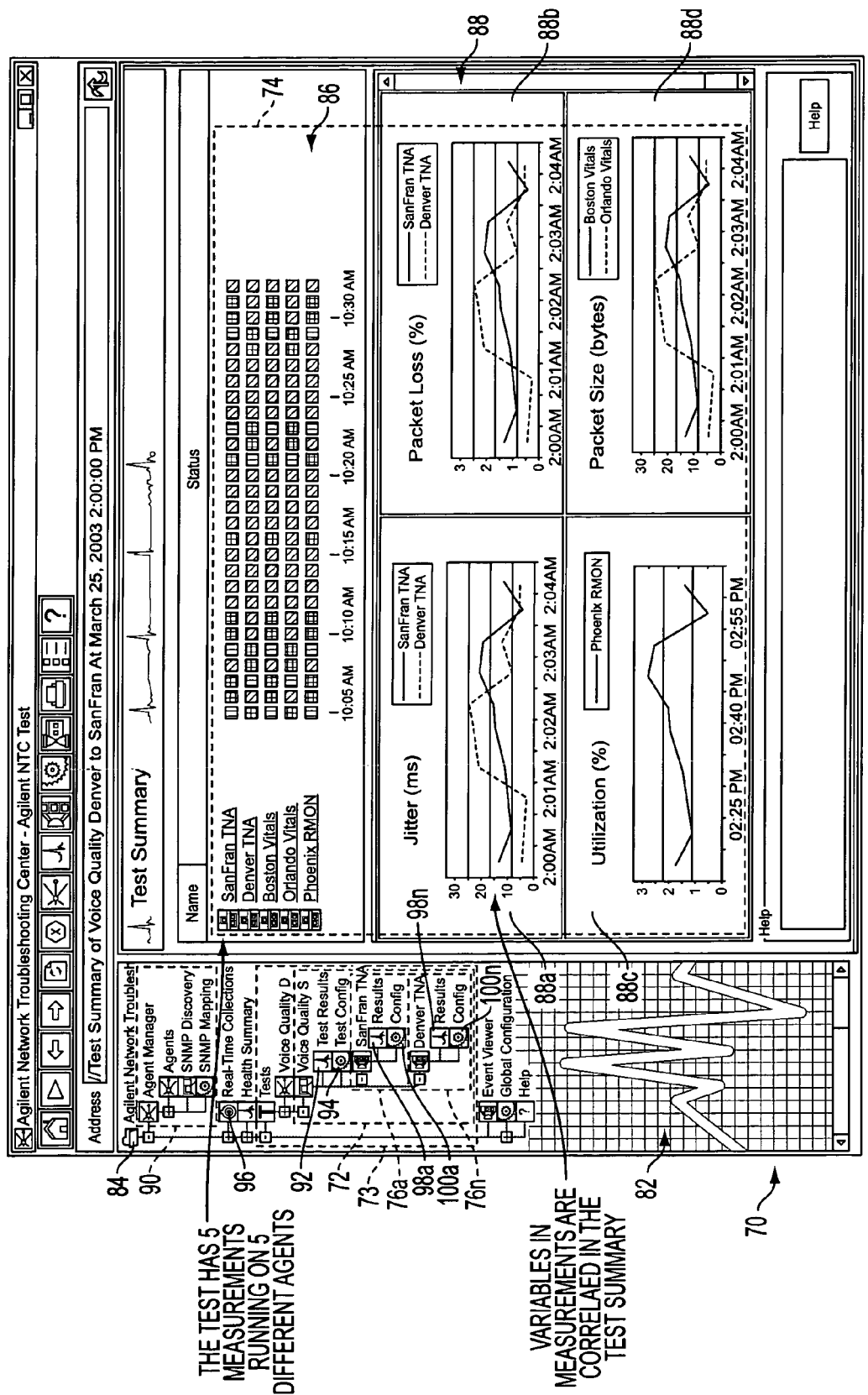
FIG. 4 is an image of a graphical user interface providing a test summary view, according to an embodiment of the present invention.

FIG. 4 is an example image of a graphical user interface providing a test summary view, according to an embodiment of the present invention. In particular, as will be described in more detail further below, FIG. 4 is an image of a GUI 70 providing a top-level test view. In FIG. 4, the test manager 40 presents the GUI 70 to manage a test, which includes creating/adding a new test. According to the present invention, a network-related measurement test GUI is an overall visual packaging up of all the network-related measurements from the agents. The network-related measurements are processes that actually gather data, but, typically, via the GUI 70 a user can look at test results (i.e., a user can view a window that displays correlated data from various network analysis agent measurements running as part of a test). Accordingly, the test manager 40 actually keeps track of a test (or all the tests, as the case may be), which is visual correlation of selected measurements from two or more agents, thereby letting a user to actually view a correlated measurement results from different/various (two or more) network analysis agents 20, 22, and 24.

More particularly, in FIG. 4, the test manager 40 provides a graphical user interface 70 that provides a link 72 to network related measurements by network analysis devices (agents) to present a test 74 including perceptibly (e.g., visually) correlated network-related measurements by two or more of the network analysis devices through a selectable graphical display corresponding to the network analysis devices 76a-n, and a selectable graphical display corresponding to at least one measurement for each selected network analysis device 78a-n. The network analysis devices can be heterogeneous, and the test manager 40 displays, in windows 86 and 88 of the graphical user interface 70, a graphical correlated result of network-related measurements from the heterogeneous devices as a heterogonous test 74, thereby allowing measurement of two or more network segments including the heterogeneous devices. In other words the test 74, which is a top-level test view, allows a user to view the results from all the measurements from the agents in one or different time lines in a visually correlated manner according to all measurements from each agent as an aggregated measurement view (e.g., window 86) as well as according to the agents performing a particular measurement via a plurality of correlated graphs of the measurements by different agents (e.g., window 88). Because the agents are provided at various network segments, the test manager 40, which provides the network-related measurement test GUI 70, allows traversing multiple network segments to troubleshoot a network. Although the above example describes correlation over a time parameter, the present invention is not limited to such a configuration, and correlation of measurement from multiple different agents may be according to any parameter(s), such as any type of specified threshold, distance, trends, etc.

With reference to FIG. 3 and FIG. 4, as an example, the test 74, which is a collection of measurements visually correlated together, can be for troubleshooting voice quality between Denver and San Francisco. The test 74 has five measurements running (typically simultaneously) on five different agents at different locations of SanFran TNA 20b, Denver TNA 20a, Boston Vitals 24b, Orlando Vitals 24a, and Pheonix RMON 22a. The measurement performed by each agent comprises four network-related variables of Jitter, Packet Loss, Utilization, and Packet Size. These measurement variables are visually correlated to provide the test 74 according to various correlation views. For example, the test 74 can be viewed in two windows panes 86 and 88 of the GUI 70. The window 86 displays (presents a view of) the test 74 according to a historical status of each measurement from each of the five agents in a time line (i.e., 10:05 AM to 10:30 AM). A state or status of the measurement from each agent is indicated with a line of blocks differentiated according to a state. For example, blocks colored in red, yellow, and green (shown as color gray shades in FIG. 4) can be presented as corresponding to under (good), at (getting bad), or exceeding (worse) thresholds. The measurement state of an agent basically shows a characteristic of a detected measurement by that particular agent (e.g., SanFran TNA 20b) in a time period. For example, a green block could mean that everything was basically okay by the measurement being below specified thresholds. A yellow block could mean that the agent is starting to see some problems by the measurement being at or near the specified thresholds. A red block could mean that there is a likelihood of some problems by the measurement being at or above the specified thresholds.

In FIG. 4, window 88 is segmented to display the test 74 as four graphs of the measurement variables from the five agents. Advantageously, as shown by the legends for each of the four graphs, the GUI 70 visually correlates on the screen the variables between different measurements in the four segments and visually correlates the variables by different agents in each segment (e.g., window segment 88a). Typically, the visual correlation is according to a time line (same or varying as desired), on the screen. For example, in window segments 88a and 88b, respectively, jitter and packet loss measurement variables from the SanFran TNA 20b and the Denver TNA 20a are visually correlated in graphs in a 2:00 AM through 2:04 AM time period. In window segment 88d, packet size measurement variables from the Boston Vitals 24b and the Orlando Vitals 24a is visually correlated by the graph in the same time line as the window segment correlations 88a and 88b. Similarly, in window 88c a utilization percentage from the phoenix RMON is visually correlated in a graph displayed in the GUI 70 on the screen.

In FIG. 4, tests are defined using a tree structure. According to an aspect of the invention, the graphical user interface 70 displays a vertically oriented rectangular window 82, and displays in the window a hierarchical icon tree 84 of selectable graphical displays of parent-child icons corresponding, respectively, to the tests 73 and the network analysis devices for each test 76a-n. More particularly, the tests 73 is a selectable parent icon of the tree 84 as a test manager icon 73 with a plurality of child icons corresponding to a plurality of the test icon trees 72 (e.g., Voice Quality-D test, Voice Quality-S test, etc). In other words, each the test icon tree 72 defines a test, such as the test 74. Typically, the window 82 is displayed on the left side of the screen. Therefore, the test manager 40 presents the test manager parent icon 73 to manage the various configured tests by visually defining the tests using a tree structure. According to an aspect of the invention, as will be described in more detail further below, by launching a menu of the test icon 73, for example, by pressing a left mouse button while the mouse pointer is on the test icon 73, a test creation menu selection is displayed, which when selected launches the test manager for creating a test by adding available agents to form the test.

In FIG. 4, according to an aspect of the invention, the test parent icon 72 has a child icon that corresponds to a test results summary 92 and a child icon that corresponds to a test configuration 94. Further, for the test parent icon 72, the test network analysis device icons 76a-n each include child icons corresponding to results of the at least one measurement from each network analysis device 98a-n and to a configuration of each network analysis device 100a-n for the test.

In FIG. 4, according to an aspect of the invention, a selectable parent icon of the tree corresponds to real-time measurement collections 96 from the network analysis devices to be added into a test, or used in a test for alternative measurement viewing described in more detail below. According to an aspect of the invention, a selectable parent icon of the tree corresponds to a network analysis device manager 90 to manage the network analysis devices. Selection of the network analysis device manager icon 90 launches a graphical user interface (i.e., agent manager 42) to manage the network analysis devices for a test. The network analysis device manager parent icon 90 may also comprise a variety of specific network analysis device configuration/management services via child icons. For example, as shown in FIG. 4, a child icon for Simple Network Management Protocol (SNMP) Discovery corresponds to a process of using the SNMP protocol to contact and initiate communication with an arbitrary network analysis device, and a child icon for SNMP Mapping corresponds to a process of mapping SNMP object identification variables to physical or logical network agents. Therefore, as will be described in more detail further below, the network analysis devices can be managed via the agent manger 42 either through a separate selectable graphical display of the agent manager icon 90, or through a selectable graphical display of agent child icons 76a and 76n belonging to the test parent icon 72, because the test 74 is a visual correlation of collection of network-related measurements from two or more agents as reflected in the test icon tree 72.

In FIG. 4, if a test has already been configured, or once a test is configured, a simple selection of the parent test icon 72 runs the test, which will automatically start the test measurements on the agents. Once the measurements start collecting data, the measurements are sent to the network-related measurement test GUI 30 to present the test according to the GUI 70. Then the user can simply select either the test result summary child icon 92 of the test parent icon 72 to display the test 24, or select a particular measurement result by selecting the measurement results child icon 98a of the corresponding parent network analysis agent icon 76a to display the measurement results GUI 150.

Advantageously, by viewing the GUI 70 image with the test 74, the following troubleshooting determinations (deductions) can be made. For example, by viewing the bottom test window 88 along with the top test window 86, a user can see the specifics of why something may have been green, yellow, or red at a specific instant in time, with respect to different agents. More particularly, the test 74 really informs the user of what the measurement results were and how the network was behaving at a particular instant in time for a specific network segment or segments.

For example, if any one of the agents in the test are above specified thresholds (i.e., the measurement status block lines do not show any red blocks for any of the agents), a combination of multiple network segments may be contributing to an error that the user might not see by looking at just one network segment as in the conventional troubleshooting systems. As a troubleshooting benefit, a user of the present invention's NTC GUI 30 can troubleshoot across network segments using the test 74, because the test 74 is a visual correlation of at least one measurement from two or more agents.

As another troubleshooting benefit, if, for example, the jitter or packet loss across five network segments is causing a problem, the user wouldn't necessarily see the problem in the top test window view 88, because the test view 88 only presents a historical measurement status of each agent. However, if the measurement variables from the various agents in the network segments are further mapped and correlated as in the bottom test window view 88, the user can see more information to troubleshoot the problem. For example, by visually correlating the jitter from the agents across network segments, the user may see that two, three, or some number of agents have a relatively high jitter above the specified threshold, which potentially indicates that across (in between) those network segments, in a part of the network being troubleshot, something is causing the jitter. As will be described in more detail further below, the user can then "drill" down to the agents in the suspect network segment (switching context) for additional troubleshooting. Accordingly, the bottom test view window 88 gives the user a much better idea of where to start detailed troubleshooting.

Figure 5:
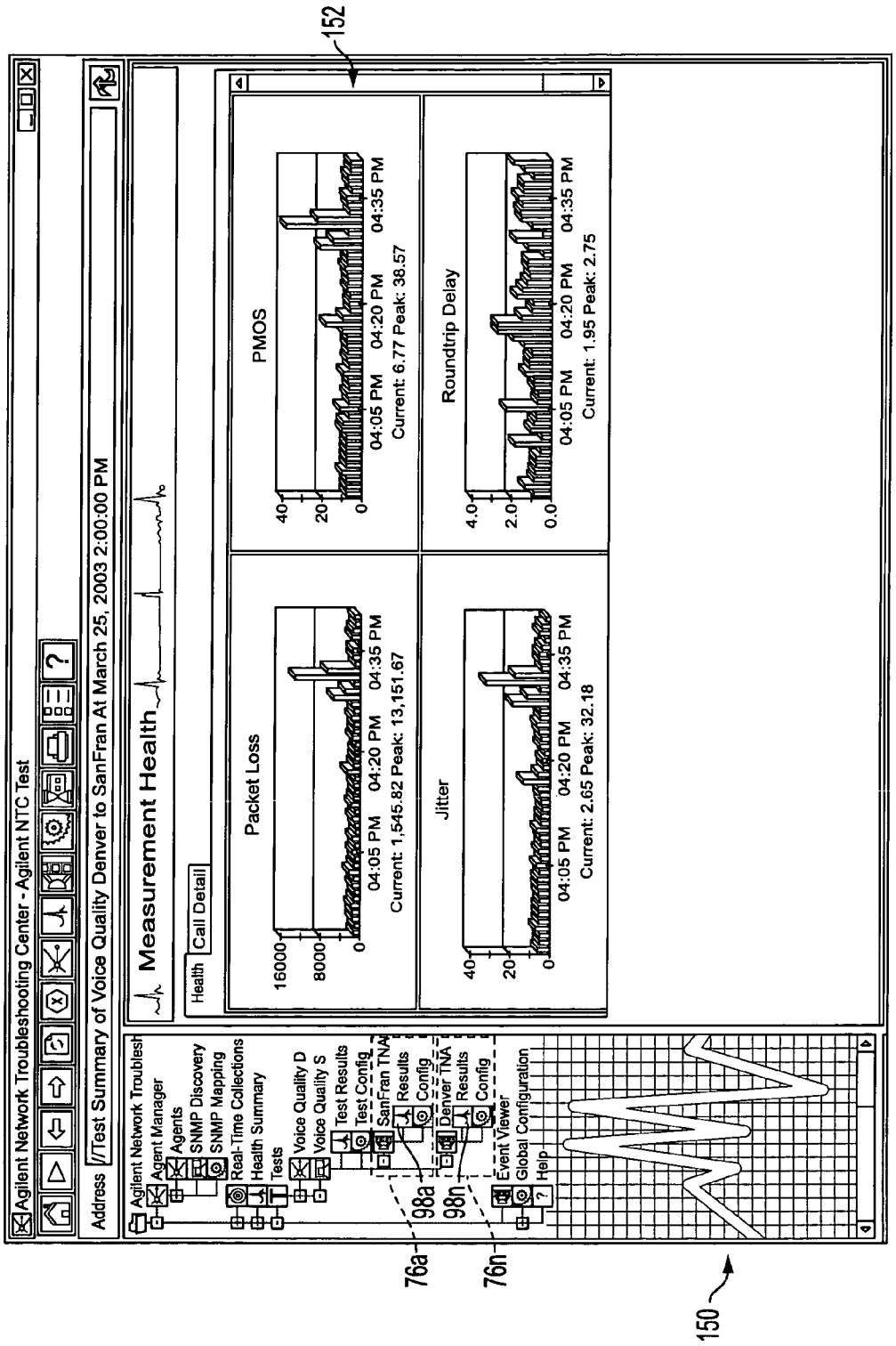
FIG. 5 is an image of a graphical user interface displaying a network-related measurement added in a test, according to an embodiment of the present invention.

FIG. 5 is an image of a graphical user interface displaying a network-related measurement added in a test, according to an embodiment of the present invention. In particular, FIG. 5 is a measurement view 150 for a specific measurement in a test. For example, selecting the measurement results child icon 98*a-n* for each test network analysis device icons 76*a-n*, launches the GUI 150 to display in window 152 the measurement variables, such as Packet Loss, Packet Size, Jitter, and Roundtrip Delay, from the respective network analysis device.

Figure 6:
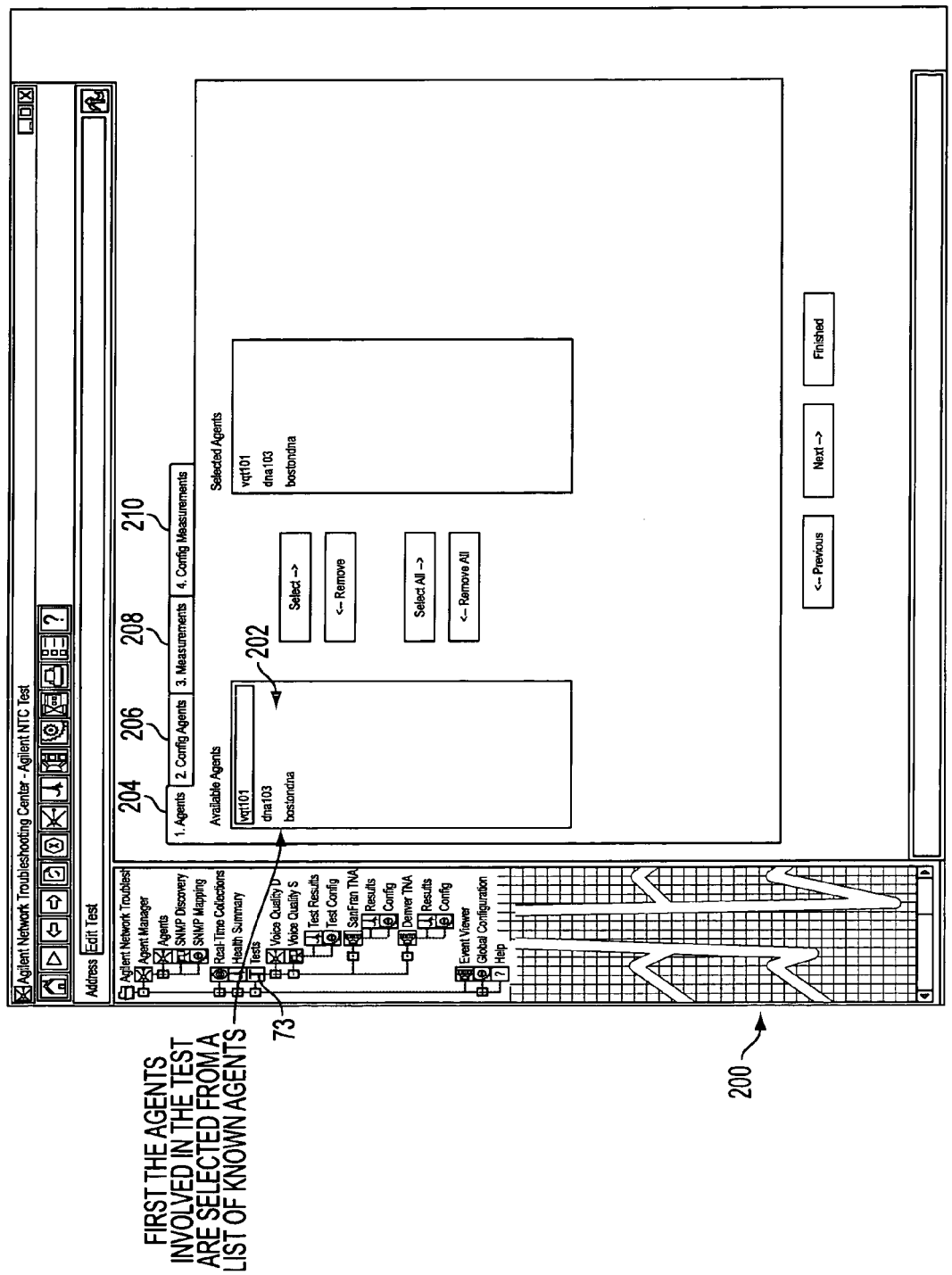
FIG. 6 is an image of a graphical user interface providing a network analysis device selection display for a test, according to an embodiment of the present invention.

FIG. 6 is an image of a graphical user interface providing a network analysis device selection display for a test, according to an embodiment of the present invention. Typically, launching a menu of the test manager icon 73, for example, by pressing a left mouse button while the mouse pointer is on the test manager icon 73, presents a test creation menu selection. Selection of the test creation menu selection launches the test manager 40 to create/add a new test. The test manager 40 launches the agent manager 42 to present a GUI 200 that displays a selectable list of available network analysis devices 202 for adding available agents into a test (i.e., selected agents). Accordingly, the GUI 200 allows easy selection and removal of available (known) network analysis agents via selectable selection and removal graphical display buttons to perform/collect measurements or from which collected measurements are retrieved/made available (as the case may be) into/from a test, thereby allowing network troubleshooting across network segments when corresponding agent measurements are visually correlated in the GUI 70. The available agents may be on different network segments, some may be on the same network segment but do different jobs, and they may be different types of agents (i.e., all of the agents don't have to be running the telephony network analyzer process, one agent can be one manufacturer protocol analyzer and another agent could be a different manufacturer protocol analyzer, another agent could be an RMON switch, and another agent could be a wireless network analyzer, etc., such that the agents don't have to be homogeneous, but heterogeneous). The GUI 30 still allows these available agents to be added to a test to display and correlate their measurement results even if they are heterogeneous. The idea is that one can dynamically add such available agents for a test at this time via the GUI 200. More particularly, as will be described in more detail further below, the GUI 200 presents a selectable graphical display of tabs corresponding to agent selection 204, agent configuration 206, agent measurement selection 208, and measurement configuration 210, which allow configuration of the agents for purpose of a test, such as the test 74.

Figure 7:
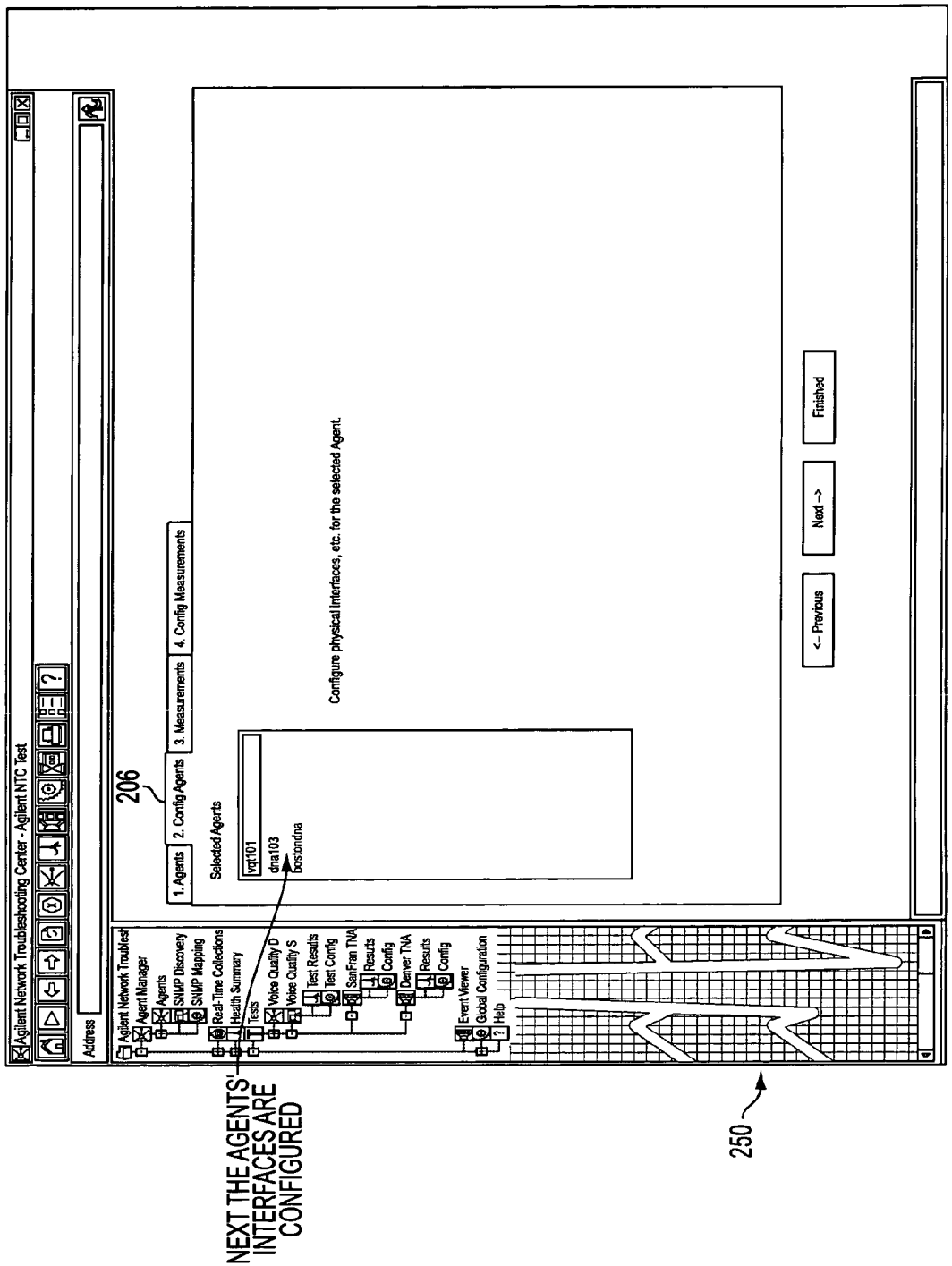
FIG. 7 is an image of a graphical user interface providing a network analysis device interface configuration display for a test, according to an embodiment of the present invention.

FIG. 7 is an image of a graphical user interface providing a network analysis device interface configuration display for a test, according to an embodiment of the present invention. Typically, after selection of the network analysis agent via the GUI 200, the agent interface configuration 44 is launched to provide a GUI 250 for selecting and configuring physical/virtual interfaces on the selected test agents to support a desired measurement. The GUI 250 may be launched via either the selectable graphical agent configuration tab 206 or by selecting a selectable graphical display of a "next" button in the GUI 200 to proceed to the next agent configuration operation. In particular, each selected test agent may have different interfaces (physical and virtual) to the network 26. For example, an agent may have an Ethernet interface, a WAN interface, or an ATM interface. Further, each network interface has network connection parameters, such as line speed, CRC, coding, etc., so that the agent can communicate with the network and retrieve network-related measurements. Because an agent may have multiple interfaces that can be used to connect to the network and each network interface has network connection parameters, the GUI 250 allows (may be optional) remote selection of the physical or virtual network interface (not shown) and network interface configurations (parameters) thereof, through selectable graphical displays of buttons, check boxes, input boxes, meters, and controls (not shown) for a test agent. Accordingly, the network interface parameters vary depending upon a network interface used/selected by an agent to connect to the network. Advantageously, the present invention allows remote network interface configuration of agents to be added into a test as a collection of visually correlated network-related measurements from the agents.

Figure 8:
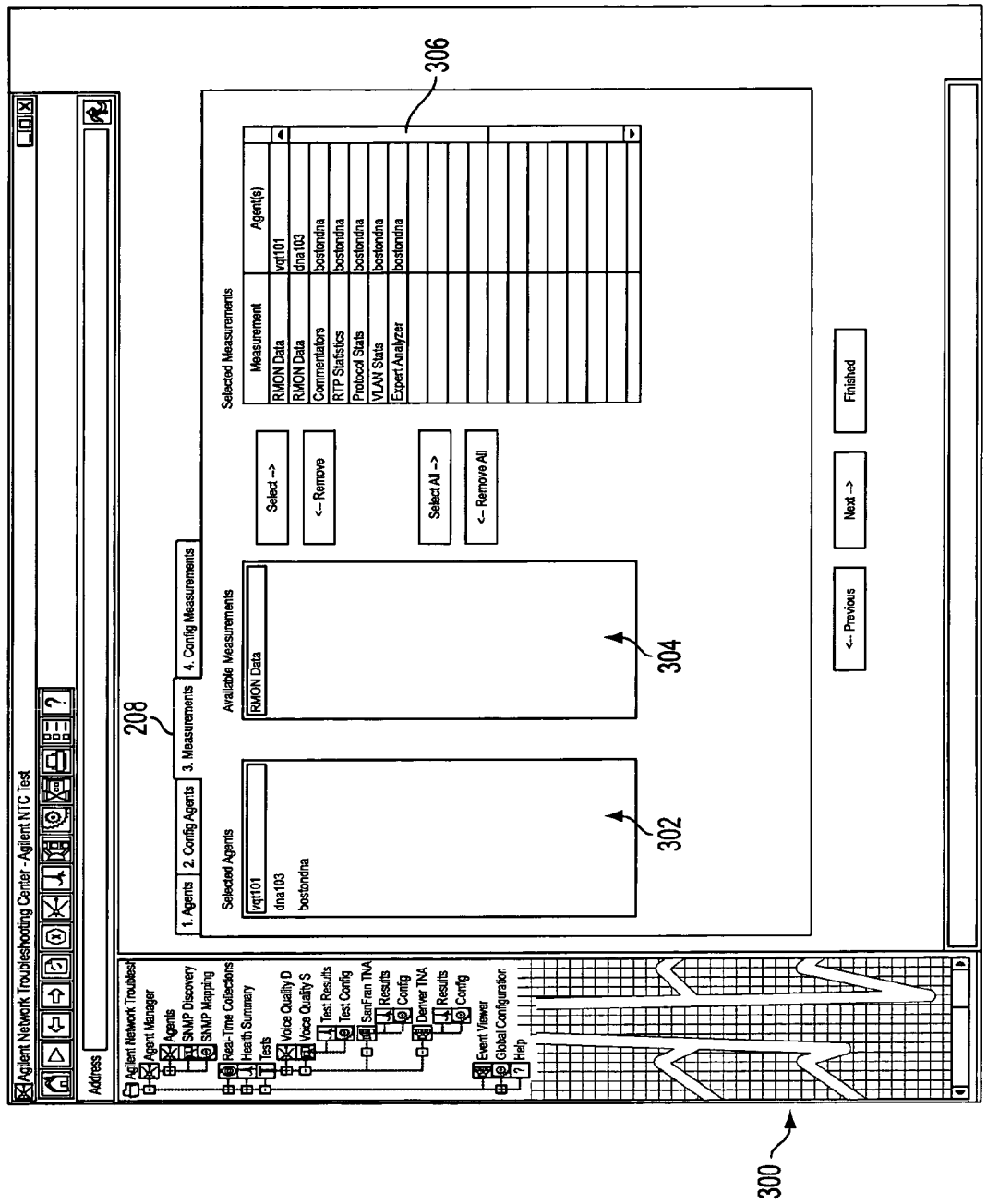
FIG. 8 is an image of a graphical user interface providing a network-related measurement selection display for a test, according to an embodiment of the present invention.

FIG. 8 is an image of a graphical user interface providing a network-related measurement selection display for a test, according to an embodiment of the present invention. Typically, a network analysis agent for a particular network interface can support various types of measurements. Typically, after selection of the network analysis agent interface configuration via the GUI 250, the agent measurement configuration 46 is launched to provide a GUI 300 for selecting available network-related measurements for a selected test agent, including its corresponding selected network interface, to support a desired measurement. The GUI 300 may be launched via either the selectable graphical measurement tab 208 or by selecting a selectable graphical display of a "next" button in the GUI 250 to proceed to the next agent configuration operation. The agent measurement configuration 46 presents the GUI 300 that display a selectable list of selected test agents 302 for selecting a test agent selected via the GUI 200 for the test. The GUI 300 also displays a selectable list of available measurements 304 to be added for the selected agent for the test. Therefore, the GUI 300 displays a selectable listing of selected measurements for each selected agent 306 for the test. Accordingly, the GUI 300 allows easy selection and removal of available (known) network analysis agent measurements for a specific selected test agent and for a specific selected network interface for that test agent (i.e., add a specific measurement for a selected specific network interface of a test agent), via selectable selection and removal graphical display buttons. The selected network analysis agents perform/collect the selected measurements for the test or from which selected collected measurements are retrieved/made available (as the case may be) for the test, thereby allowing network troubleshooting across network segments when corresponding agent measurements are visually correlated in the GUI 70.

Figure 9:
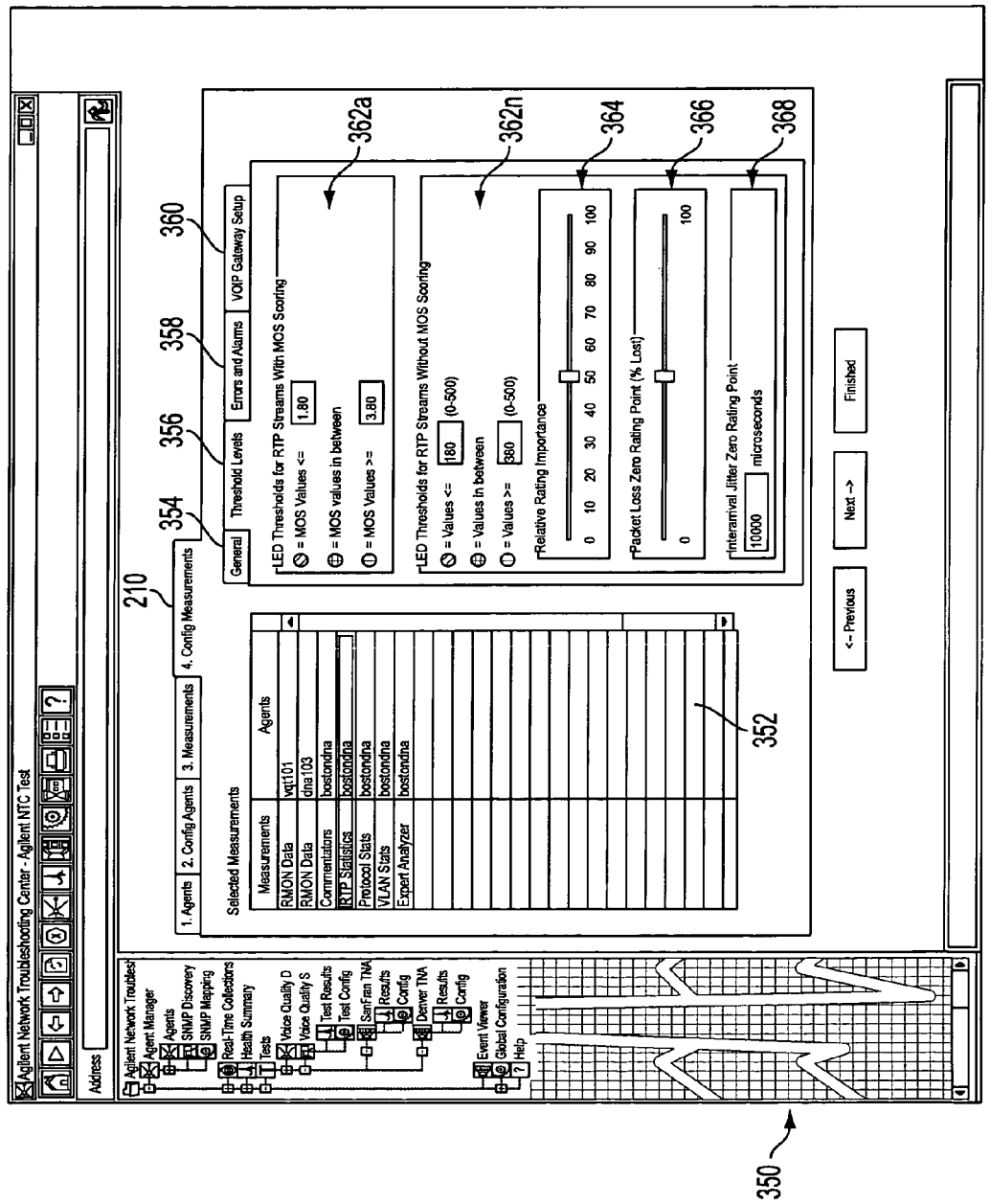
FIG. 9 is an image of a graphical user interface providing a network-related measurement configuration selection display for a test, according to an embodiment of the present invention.

FIG. 9 is an image of a graphical user interface providing a network-related measurement configuration display for a test, according to an embodiment of the present invention. Typically, after selection of the network-related measurements for the selected analysis agent via the GUI 300, the agent measurement configuration 46 provides a GUI 350 for configuring a selected network-related measurement on a select network interface of a selected test agent for a test to support a desired measurement. The GUI 350 may be launched via either the selectable graphical measurement configuration tab 210 or by selecting a selectable graphical display of a "next" button in the GUI 250 to proceed to the next agent configuration operation. The GUI 350 displays a selectable listing 352 of selected measurements for each selected agent 306 for the test. For each selected measurement of a selected agent, the GUI 350 presents a selectable graphical display of tabs corresponding to general 354, threshold levels 356, errors and alarms 358, and VOIP gateway setup 360. Each displayed measurement configuration tab provides selectable graphical displays of various available measurement configurations for a selected measurement to be run on a selected network interface of a test agent. For example, advantageously, the GUI 350 allows measurement configuration through selectable graphical displays of input boxes to specify various data communication health thresholds 362*a-n* as mapped to display colors as light-emitting diode (LED) representations, relative rating importance threshold movable control bar 364, packet loss rating threshold movable control bar 366, and jitter threshold control input box 368. For example, in FIG. 9, the selectable graphical displays 362 are for LED thresholds for Real-time Transport Protocol (RTP) streams with and without Mean Objective Score (MOS) scoring.

The agent manager 42, agent interface configuration manager 44 and agent measurement configuration manager 46, which present GUIs 200, 250, 300 and 350, interface with underlying agent integration and agent measurement addition to present these GUIs of the present invention that allow a user create and configure a test as a visual correlation of at least one measurement from two or more distributed heterogeneous agents across multiple network segments. Agent integration framework can be understood by referring to patent application titled "EXTENSIBLE NETWORK AGENT METHOD, SYSTEM, AND ARCHITECTURE", inventors Merlin A. Rhoda, et al., United States Patent Application Publication No. 2005/0097193 filed Oct. 31, 2003, which is incorporated herein by reference, and agent measurement addition can be understood by referring to patent application titled "DISTRIBUTED TESTING SYSTEM HAVING FRAMEWORK FOR ADDING MEASUREMENTS AND PHYSICAL AGENT," inventors John M. Monk and Robert H. Kroboth, United States Patent Application Publication No. 2005/0107990 filed Nov. 19, 2003 which is also incorporated herein by reference.

In FIG. 9, after configuration of the measurements, a selectable graphical display of a "finished" button presented by the GUI 350 can be selected to finish the test configuration, other agents can be added to the test and configure, or the test can be run. Once a test has been configured, a parent test icon 72 is displayed (appears) under the test manager icon 73 in the hierarchical icon tree 84, which can be selected to launch the test by starting or retrieving (as the case may be) the test measurements from the test agents. Once the test is launched via the parent test icon 72, the test network analysis agents are controlled according to known techniques to start collecting the measurement data and to send the collected data up to the GUI 30 to present the test, such as the test 74. If the test is continuously running, the test can be presented by selecting the test results child icon 92. In other words, once a test is launched, measurements can start being collected, which may be set to be continuous, or some measurement may already be continuously collecting, as the case may be, for example, in an NTC server, and at any given time the test can be presented (viewed) by selecting the test results child icon 92 to receive the collected measurements at the GUI 30 for visual correlation. The GUI 30 may be configured to present a test for any desired historical time line upon launching. Also a test can be configured to automatically launch at a specified time.

Figure 10:
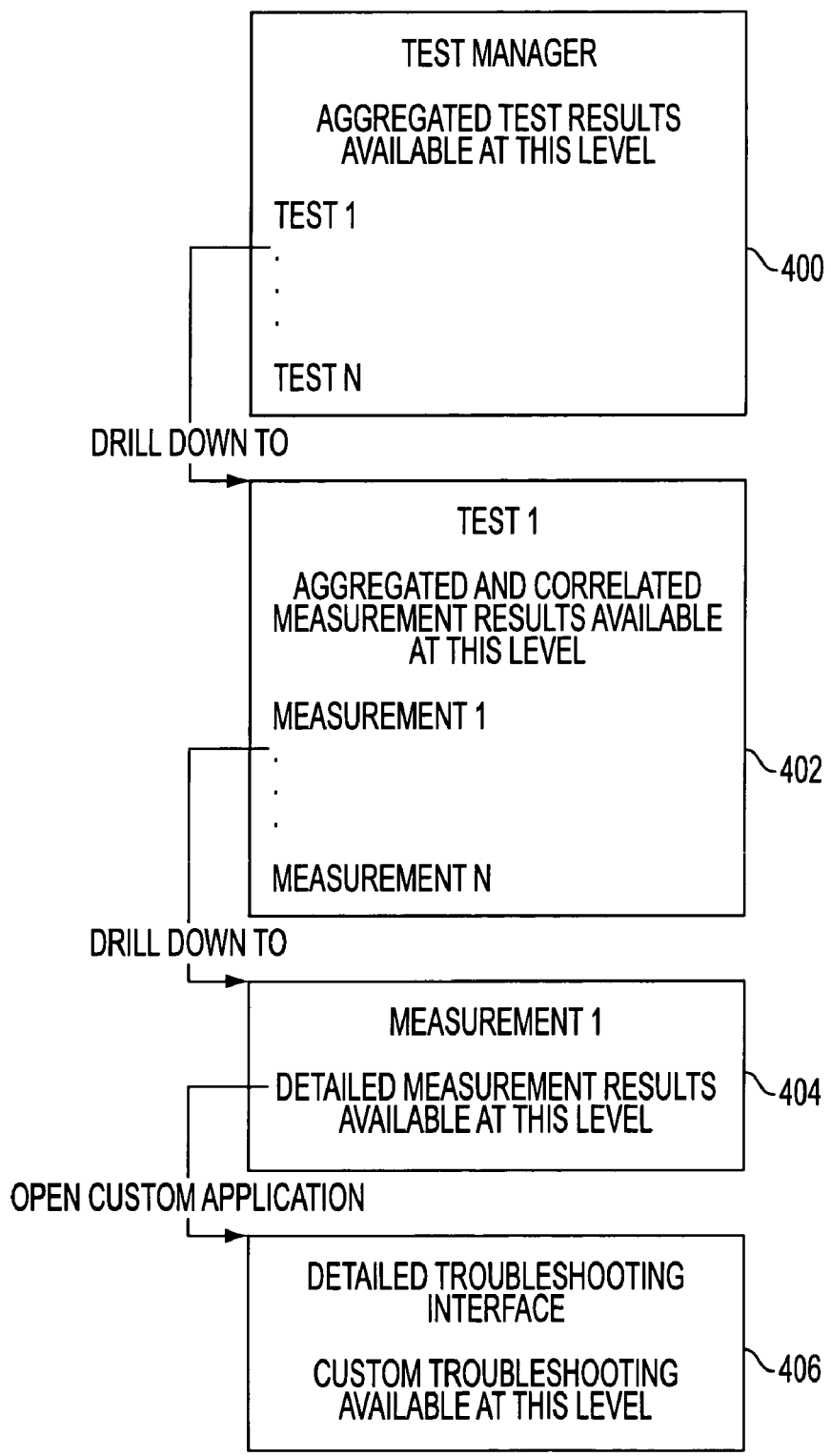
FIG. 10 is a flow chart of navigating through various levels of a test, according to an embodiment of the present invention.
Figure 11:
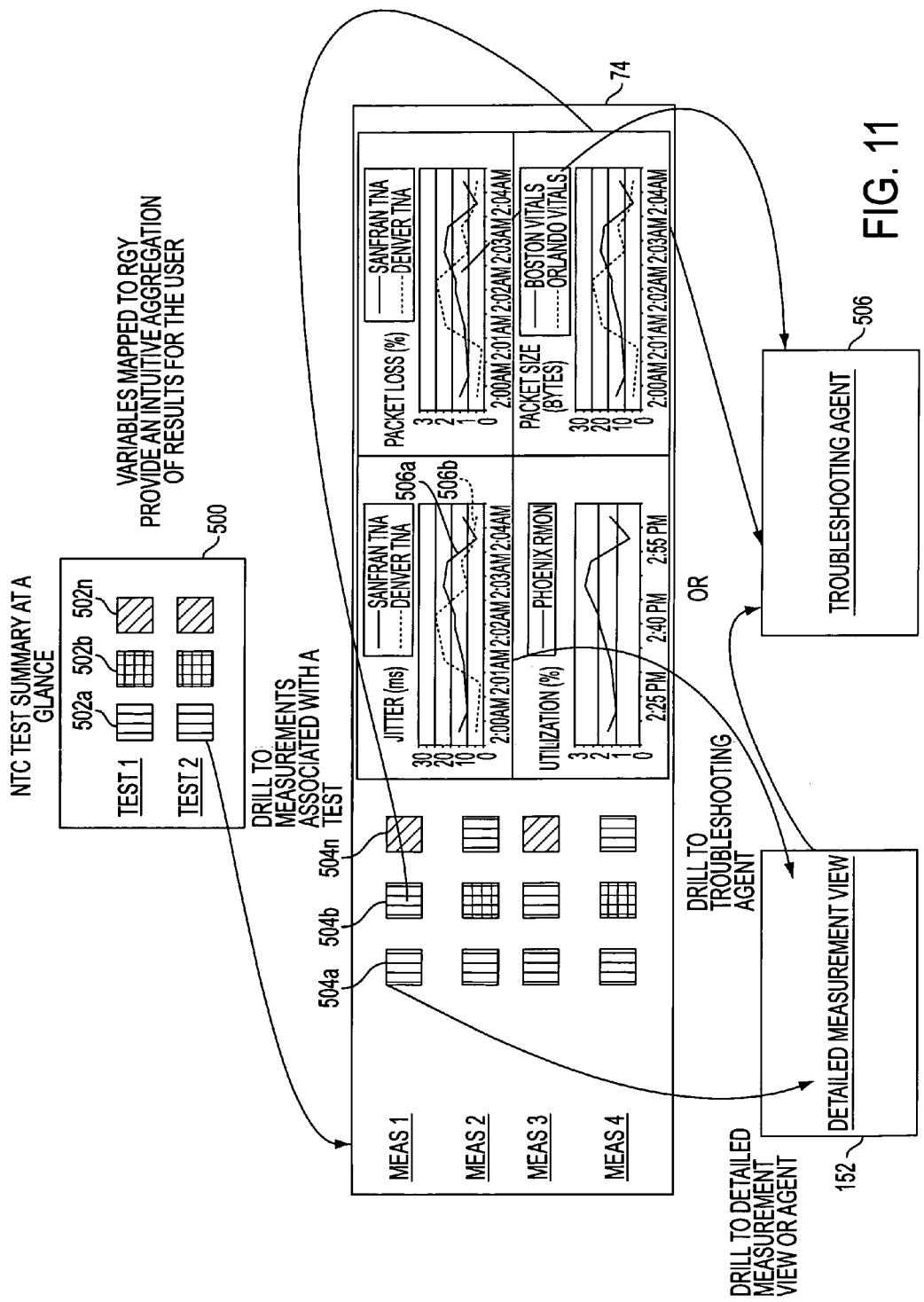
FIG. 11 is an image of graphical user interfaces for operations in FIG. 10 to navigate through the various levels of the test according, according to an embodiment of the present invention.

FIG. 10 is a flow chart of navigating through various levels of a test, according to an embodiment of the present invention. FIG. 11 is an image of graphical user interfaces for operations in FIG. 10 to navigate through the various levels of the test according, according to an embodiment of the present invention. With reference to FIGS. 10 and 11, the GUI 30 allows a user to view and navigate through various test levels. For example, at operation 400, the GUI 30 displays a test manager 40 level view 500 of available/configured tests 1 and 2, which is the most abstract level view. In FIG. 11, the GUI image 500 provides a summary of two tests at a glance. At the test manager level view 500, visually aggregated test results 502*a-n* for a period of time are displayed. The test results can be visually aggregated, for example, by mapping a status of the test results in a period of time to red, green and yellow (RGY) blocks, which can indicate network troubleshooting statuses of good, getting bad, and worse. The visually aggregated test results for each test-1 and test-2, provide to the user an intuitive aggregation of test results for each test-1 and test 2. However, the present invention is not limited to the FIG. 11 multiple test results visual correlation 500, and other types of test results correlations, such as test results correlation graphs, may be provided. The test results (test manager 40) level view 500 can be presented by selecting the tree control test manager icon 72.

At operation 402, a visually aggregated and correlated test level view for a particular test, such as test-2, is displayed. For example, in FIGS. 4 and 11, the GUI 30 displays the test 74, which is a visual aggregation and correlation of measurement results (collectively also referred to a correlated measurements from different agents). In particular, the user can navigate from the test manager level view 500 to the lower level test view 74 in a time period by selecting a selectable graphical display of a test result 502*a-n*, which typically are provided in a time line (i.e., to "drill" down to visually correlated measurements associated with a test). For example, if a graphical display of the aggregated test result 502*a* for test-1, in a time period, shows a red color, indicating network trouble, the user can "drill" down to the test view 74 to view correlated measurements comprising the test-1. The user can immediately via a single test view 74 isolate the network segment or segments having trouble.

At operation 404, a detailed measurement results level view of a particular agent is displayed, for example, via the GUI 150. At operation 404, detailed measurement results of the particular agent (in FIG. 11, in case of one measurement per agent, the test 74 can refer to the various measurements only by meas-1, meas-2, etc.) are displayed which can also correspond to the measurement result view 152 of GUI 150, or to a standard agent GUI view 506 for the detailed measurement results and further troubleshooting. More particularly, the user can navigate from the test level view 74 to the lower level detailed measurement view for a time period by selecting a selectable graphical display of an aggregated measurement result 504*a-n* or a correlated measurement graph line 506*a-n* (e.g., selecting the jitter graph line for Denver TNA 506*b*), which typically are provided in a time line (i.e., to "drill" down to the detailed measurement result view 152 of GUI 150). At operation 406, custom troubleshooting processes (custom application) may be available (as the case may be). Such test level navigation may be made via selectable graphical displays (not shown) at each GUI 70 and 150.

As described above, the present invention actually correlates measurement results from different agents for a user on the screen, so that the user can view a visual measurement correlation. More particularly, the present invention provides a new customized measurement function by visually correlating measurements from many agents. In other words, the present invention seamlessly allows adding new measurements to a distributed network troubleshooting system via configuring tests as views of correlated measurements from two or more different agents (i.e., basically a newly configured test dynamically, intuitively, and in a consistent fashion adds new functionality to the troubleshooting system). In other words, a configured test provides (serves) as a newly added measurement. Further, in the context of a system provider, the present invention allows the customer or third parties to add new measurement via the concept of "test" as a correlation of measurements from multiple and/or different troubleshooting agents. The conventional distributed network troubleshooting systems fail to provide way a user can control configuration and execution of the agent measurements at two or more agents from a central place. In other words, in contrast to conventional troubleshooting systems, the GUI 30 of the present invention provides a central place to configure and run many types of network-related measurements at different network analysis devices as a test and to troubleshoot the network based upon such test. Further, the GUI 30 allows simultaneous running of multiple tests. Accordingly, the GUI 30 of the present invention provides measurements from across network segments involving two or more network analysis agents in a correlated view to isolate troubled network segments so that tools on the troubled network segment can be used to further troubleshoot and correct the problem (i.e., provides measurement results analysis, including troubleshooting, displays across network segments).

With the GUI 30 of the present invention as illustrated in FIG. 4-9, a visual correlation of at least one measurement from two or more agents can be dynamically created from existing or launched measurement collections by combining the at least one measurement from different agents. The GUI 30 of the present invention allows the user to quickly "drill" to the agent reporting a problem to enable very fast access to troubleshooting functionality from one location. The GUI 30 permits "drilling" into more detailed views, or the user can "drill" right to the agent supplying the measurement data, such as a GUI of an agent. "Drilling" path is flexible by allowing the user to visually follow the data to the correct network analysis agent (troubleshooting agent) from among a plurality of such agents participating in a visual correlation of their measurements as a test. More particularly, the GUI 30 allows drill down from a multi-segment view to a single segment network analysis device view rapidly so that the user can get to the actual problem very quickly. Further, the conventional troubleshooting systems do not provide selectable graphical displays of tree and configuration tab dialogues to add measurements into a test by selecting agents, by selecting each agent interface configuration, by selecting each agent measurements, and by selecting each agent selected measurement configuration as shown in FIGS. 6-9.

Although in the above-described example embodiments, the test 74 uses the jitter, packet loss, packet size, and utilization measurement variables and visually correlates these variables using graphs (correlation graphs) and colored blocks, the present invention is not limited to such a configuration, and any known and foreseeable or arbitrary measurement variables, including a combination of configured tests, can be used for the visual correlation. In other words, any measurement from different network devices can be run and the data correlated. Further, the present invention is not limited to the line graph and color block correlation presentations of test 74, and other types of correlation presentations can be used, such as (without limitation) other visual correlation presentations, such as pie charts, bar graphs, diagrams, object images, tables, etc., and sound, text, etc. correlation presentations, thereby quickly (at once) and centrally making network troubleshooting information across network segments accessible to a user. Accordingly, the present invention provides a method of presenting a selectable graphical display of known heterogeneous network analysis devices on a network to add into a test, presenting a selectable graphical display of known network-related measurements corresponding to each selected network analysis device, presenting a graphical user interface to the test by displaying a visual correlation of the selected network-related measurements from the heterogeneous network analysis devices. Further, the present invention provides a computer in network communication with computer agents providing network related measurements, the computer comprising a programmed computer processor providing a graphical user interface to a test as a collection of correlated (e.g., visually correlated) one or more computer agent measurements from two or more computer agents.

The present invention relates to testing of a network. The present invention is not limited to any particular type of network or any particular type of network protocols or technology. For example, a network might be based on, or be a combination of, wired, wireless, optical, circuit-switched, packet and/or voice-over-Internet Protocol (VOIP) technologies. A network might be, for example, a public, private or combination public/private network. A network might be or include, for example, the Internet.

The present invention relates to tests and measurements. The present invention is not limited to any particular tests or any particular measurements.

The many features and advantages of the invention are apparent from the detailed specification and, thus, it is intended by the appended claims to cover all such features and advantages of the invention that fall within the true spirit and scope of the invention which is defined in the claims. Further, since numerous modifications and changes will readily occur to those skilled in the art, it is not desired to limit the invention to the exact construction and operation illustrated and described, and accordingly all suitable modifications and equivalents may be resorted to, falling within the scope of the invention which is defined in the claims and their equivalents.

What is claimed is:

1. An internet protocol network testing apparatus, comprising:

a plurality of network analysis devices, each network analysis device operable to conduct a plurality of different kinds of tests, selected from the group consisting of jitter, packet loss, utilization, and packet size, on a different segment between nodes of a distributed internet protocol network;

a graphical user interface providing a link to network related measurements by the network analysis devices, to present a test including a visual aggregation of measurement results from the plurality of different kinds of tests from two or more of the plurality of network analysis devices providing a visual indication of one of a plurality of threshold status indicators of each segment on a timeline in a visually correlated manner;

perceptibly correlated network-related measurements by two or more of the plurality of network analysis devices through a selectable graphical display of the network analysis devices enabling identification of which of the different kinds of tests caused changes in the threshold status indicator, and a selectable graphical display of at least one network-related measurement for each selected network analysis device;

wherein, in response to user selection of the two or more of the network analysis devices, and in response to user selection of the at least one network-related measurement, from the selectable graphical display, the graphical user interface causes the two or more of the network analysis devices and the at least one network related measurement to be added to the test; and wherein the perceptibly correlated network-related measurements are visual correlations as a top-level test view of the test and selectable to navigate to lower test levels of detailed network-related measurement views of each network analysis device.

2. The apparatus of claim 1, wherein the network analysis devices are heterogeneous, and the graphical user interface presents as the perceptible correlation correlated graphs of network-related measurements from the heterogeneous devices as a heterogeneous test, thereby allowing a new measurement of two or more adjacent network segments including the heterogeneous devices.

3. The apparatus of claim 1, wherein the graphical user interface displays a vertically oriented window, and displays in the window a hierarchical icon control tree of selectable parent-child icons corresponding, respectively, to the test and the network analysis device for the test.

4. The apparatus of claim 3, wherein child icons of the test parent icon correspond to a test results summary, to a test configuration, and to the test network analysis devices that each include child icons corresponding to results of the at least one measurement from each network analysis device and to a configuration of each network analysis device.

5. The apparatus of claim 3, wherein a selectable parent icon of the tree corresponds to real-time measurement collections from the network analysis devices to be added into the test.

6. The apparatus of claim 3, wherein a selectable parent icon of the tree corresponds to the network analysis devices to launch a graphical user interface to manage the network analysis devices for the test.

7. The apparatus of claim 1, wherein the at least one network-related measurement for each selected network analysis device is an existing collection of network-related measurements.

8. The apparatus of claim 1, wherein the selectable graphical display of the network analysis devices comprises graphical tab dialogues of analysis device selection, analysis device configuration, analysis device measurement selection, and analysis device measurement configuration, allowing selection and configuration of analysis devices added into the test.

9. The apparatus of claim 1, wherein the measurement results are visually correlated according to parameters selected from a time line, a threshold, and a trend.

10. The apparatus of claim 1, wherein the selectable graphical display of the network analysis devices comprises a list of available network analysis devices, a list of network analysis devices added into the test, and selection and removal graphical display buttons to add and remove an available network analysis device to/from the list of added network analysis devices.

11. The apparatus of claim 10, wherein the selectable graphical display of the at least one network-related measurement comprises a list of available network-related measurements for each network analysis device in the list of added network analysis devices.

12. The apparatus of claim 1, wherein the selectable graphical display of the at least one network-related measurement comprises selectable graphical displays of measurement configurations for each network analysis device measurement.

13. The apparatus of claim 4, wherein a selectable parent icon of the tree corresponds to a test manager managing a plurality of tests and including a plurality of child test icons.

14. The apparatus of claim 1, wherein for the visual aggregation of measurement results, the graphical user interface presents a plurality of tests according to a time line as visually aggregated test results for each test and each aggregated test result is selectable in each time line time period to navigate to each test as the visually correlated network-related measurements at each time period in the time line.

15. The apparatus of claim 1, wherein the graphical user interface comprises:
a test manager managing creation, update and deletion of the test,
an agent manager managing creation, selection, and removal of the network analysis devices in the test;
an agent network interface configuration manager managing selection and configuration of network interfaces a network analysis device added in the test; and
an agent measurement configuration manager managing selection, configuration, and removal of a network-related measurement on a selected network interface for the network analysis device added in the test.

16. A computer in network communication with a plurality of computer agents providing network related measurements of different segments of the network, the computer comprising:
a programmed computer processor providing a graphical user interface, the graphical user interface providing a link to the network related measurements provided by the computer agents, to present a plurality of different kinds of tests, selected from the group consisting of jitter, packet loss, utilization, and packet size, as a including:
a visual aggregation of measurement results from the plurality of different kinds of tests from two or more of the plurality of network analysis devices in adjacent segments providing a visual indication of one of a plurality of threshold status indicators of each segment on a timeline in a visually correlated manner;
perceptibly correlated network related measurements from the plurality of different kinds of tests by two or more of the computer agents through a selectable graphical display of the computer agents enabling identification of which of the tests caused changes in the threshold status indicator, and
a selectable graphical display of a least one network related measurement for each selected computer agent;
wherein, in response to user selection of the two or more of the computer agents, and in response to user selection of the at least one network related measurement, from the selectable graphical displays, the graphical user interface causes the two or more of the computer agents and the at least one network related measurement to be added to the test; and
wherein the perceptibly correlated network-related measurements are visual correlations as a top-level test view of the test and selectable to navigate to lower test levels of detailed network-related measurement views of each network analysis device.

17. A method, comprising:
presenting a selectable graphical display of known heterogeneous network analysis devices, each analysis device on a different segment between nodes of a network;
selecting a plurality of the analysis devices;
presenting a selectable graphical display of a plurality of different types of known network-related tests, selected from the group consisting of jitter, packet loss, utilization, and packet size, corresponding to each selected network analysis device;

selecting a plurality of the different types of network-related tests;

presenting a graphical user interface for displaying:

a visual aggregation of the selected different types of network-related tests results from the plurality of different types of tests from each of the selected network analysis devices providing a visual indication of one of a plurality of threshold status indicators of each segment on a timeline in a visually correlated manner;

a visual correlation of the selected network-related measurements from the selected heterogeneous network analysis devices enabling identification of which of the tests caused changes in the threshold status indicator; and a visual representation of the selected network-related measurement from one of the network analysis devices.

* * * * *